(12) United States Patent
Brickell et al.

(10) Patent No.: US 8,014,530 B2
(45) Date of Patent: Sep. 6, 2011

(54) METHOD AND APPARATUS FOR AUTHENTICATED, RECOVERABLE KEY DISTRIBUTION WITH NO DATABASE SECRETS

(75) Inventors: Ernest Brickell, Portland, OR (US); Gary Graunke, Hillsboro, OR (US); William A. Stevens, Folsom, CA (US); Balaji Vembu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 987 days.

(21) Appl. No.: 11/387,203

(22) Filed: Mar. 22, 2006

(65) Prior Publication Data
US 2007/0223704 A1 Sep. 27, 2007

(51) Int. Cl.
*H04L 9/08* (2006.01)
(52) U.S. Cl. .......................... 380/286; 380/281
(58) Field of Classification Search .................. 380/281, 380/286
See application file for complete search history.

(56) References Cited

U.S. PATENT DOCUMENTS

| | | | |
|---|---|---|---|
| 3,699,532 A | 10/1972 | Schaffer et al. | |
| 3,996,449 A | 12/1976 | Attanasio et al. | |
| 4,037,214 A | 7/1977 | Birney et al. | |
| 4,162,536 A | 7/1979 | Morley | |
| 4,207,609 A | 6/1980 | Luiz et al. | |
| 4,247,905 A | 1/1981 | Yoshida et al. | |
| 4,276,594 A | 6/1981 | Morley | |
| 4,278,837 A | 7/1981 | Best | |
| 4,307,447 A | 12/1981 | Provanzano et al. | |
| 4,319,233 A | 3/1982 | Matsuoka et al. | |
| 4,319,323 A | 3/1982 | Ermolovich et al. | |
| 4,347,565 A | 8/1982 | Kaneda et al. | |
| 4,366,537 A | 12/1982 | Heller et al. | |
| 4,403,283 A | 9/1983 | Myntti et al. | |
| 4,419,724 A | 12/1983 | Branigin et al. | |
| 4,430,709 A | 2/1984 | Schleupen | |

(Continued)

FOREIGN PATENT DOCUMENTS

CN 1985466 6/2007

(Continued)

OTHER PUBLICATIONS

Bruce Schneier, Applied Cryptography Second Edition, 1996, John Wiley & Sons, pp. 513-514.*

(Continued)

*Primary Examiner* — Christian LaForgia
*Assistant Examiner* — Brian Olion
(74) *Attorney, Agent, or Firm* — Blakely, Sokoloff, Taylor & Zafman LLP

(57) ABSTRACT

A method and apparatus for authenticated recoverable key distribution are described. In one embodiment, an application key is provided to an integrated chip platform. In one embodiment, the integrated chip platform encrypts the application key with a Key Encryption Key, which is stored within the persistent memory on the platform, and outputs a ChipID and the encrypted application key to enable recovery. In one embodiment, the platform can provide the ChipID to a recovery database to replace a lost encrypted application key. In one embodiment, the ChipID is the public key of a public/private key pair, and the application key is provided to the integrated chip platform by encrypting it using this public key. In one embodiment, the ChipID and the Key Encryption Key are derived from a secret random number programmed into the integrated chip. Other embodiments are described and claimed.

26 Claims, 8 Drawing Sheets

U.S. PATENT DOCUMENTS

| | | | |
|---|---|---|---|
| 4,521,852 A | 6/1985 | Guttag | |
| 4,529,870 A | 7/1985 | Chaum | |
| 4,571,672 A | 2/1986 | Hatada et al. | |
| 4,621,318 A | 11/1986 | Maeda | |
| 4,759,064 A | 7/1988 | Chaum | |
| 4,795,893 A | 1/1989 | Ugon | |
| 4,802,084 A | 1/1989 | Ikegaya et al. | |
| 4,825,052 A | 4/1989 | Chemin et al. | |
| 4,843,541 A | 6/1989 | Bean et al. | |
| 4,907,270 A | 3/1990 | Hazard | |
| 4,907,272 A | 3/1990 | Hazard | |
| 4,910,774 A | 3/1990 | Barakat | |
| 4,974,159 A | 11/1990 | Hargrove et al. | |
| 4,975,836 A | 12/1990 | Hirosawa et al. | |
| 5,007,082 A | 4/1991 | Cummins | |
| 5,022,077 A | 6/1991 | Bealkowski et al. | |
| 5,075,842 A | 12/1991 | Lai | |
| 5,079,737 A | 1/1992 | Hackbarth | |
| 5,187,802 A | 2/1993 | Inoue et al. | |
| 5,230,069 A | 7/1993 | Brelsford et al. | |
| 5,237,616 A | 8/1993 | Abraham et al. | |
| 5,255,379 A | 10/1993 | Melo | |
| 5,287,363 A | 2/1994 | Wolf et al. | |
| 5,293,424 A | 3/1994 | Holtey et al. | |
| 5,295,251 A | 3/1994 | Wakui et al. | |
| 5,317,705 A | 5/1994 | Gannon et al. | |
| 5,319,760 A | 6/1994 | Mason et al. | |
| 5,361,375 A | 11/1994 | Ogi | |
| 5,386,552 A | 1/1995 | Garney | |
| 5,421,006 A | 5/1995 | Jablon et al. | |
| 5,434,999 A | 7/1995 | Goire et al. | |
| 5,437,033 A | 7/1995 | Inoue et al. | |
| 5,442,645 A | 8/1995 | Ugon et al. | |
| 5,455,909 A | 10/1995 | Blomgren et al. | |
| 5,459,867 A | 10/1995 | Adams et al. | |
| 5,459,869 A | 10/1995 | Spilo | |
| 5,469,557 A | 11/1995 | Salt et al. | |
| 5,473,692 A | 12/1995 | Davis | |
| 5,479,509 A | 12/1995 | Ugon | |
| 5,504,922 A | 4/1996 | Seki et al. | |
| 5,506,975 A | 4/1996 | Onodera | |
| 5,511,217 A | 4/1996 | Nakajima et al. | |
| 5,515,441 A | 5/1996 | Faucher | |
| 5,522,075 A | 5/1996 | Robinson et al. | |
| 5,528,231 A | 6/1996 | Patarin | |
| 5,533,126 A | 7/1996 | Hazard et al. | |
| 5,555,385 A | 9/1996 | Osisek | |
| 5,555,414 A | 9/1996 | Hough et al. | |
| 5,560,013 A | 9/1996 | Scalzi et al. | |
| 5,564,040 A | 10/1996 | Kubala | |
| 5,566,323 A | 10/1996 | Ugon | |
| 5,568,552 A | 10/1996 | Davis | |
| 5,574,936 A | 11/1996 | Ryba et al. | |
| 5,582,717 A | 12/1996 | Di Santo | |
| 5,604,805 A | 2/1997 | Brands | |
| 5,606,617 A | 2/1997 | Brands | |
| 5,615,263 A | 3/1997 | Takahashi | |
| 5,628,022 A | 5/1997 | Ueno et al. | |
| 5,628,023 A | 5/1997 | Bryant et al. | |
| 5,631,961 A | 5/1997 | Mills et al. | |
| 5,633,929 A | 5/1997 | Kaliski, Jr. | |
| 5,657,445 A | 8/1997 | Pearce | |
| 5,668,971 A | 9/1997 | Neufeld | |
| 5,680,547 A | 10/1997 | Chang | |
| 5,684,948 A | 11/1997 | Johnson et al. | |
| 5,699,431 A | 12/1997 | Van Oorschot et al. | |
| 5,706,469 A | 1/1998 | Kobayashi | |
| 5,717,903 A | 2/1998 | Bonola | |
| 5,720,609 A | 2/1998 | Pfefferle | |
| 5,721,222 A | 2/1998 | Bernstein et al. | |
| 5,724,425 A | 3/1998 | Chang et al. | |
| 5,729,760 A | 3/1998 | Poisner | |
| 5,737,604 A | 4/1998 | Miller et al. | |
| 5,737,760 A | 4/1998 | Grimmer, Jr. et al. | |
| 5,740,178 A | 4/1998 | Jacks et al. | |
| 5,752,046 A | 5/1998 | Oprescu et al. | |
| 5,757,918 A | 5/1998 | Hopkins et al. | |
| 5,757,919 A | 5/1998 | Herbert et al. | |
| 5,764,969 A | 6/1998 | Kahle | |
| 5,771,291 A | 6/1998 | Newton et al. | |
| 5,796,835 A | 8/1998 | Saada | |
| 5,796,845 A | 8/1998 | Serikawa et al. | |
| 5,805,712 A | 9/1998 | Davis | |
| 5,809,546 A | 9/1998 | Greenstein et al. | |
| 5,815,665 A | 9/1998 | Teper et al. | |
| 5,825,875 A | 10/1998 | Ugon | |
| 5,825,880 A | 10/1998 | Sudia et al. | |
| 5,835,594 A | 11/1998 | Albrecht et al. | |
| 5,844,986 A | 12/1998 | Davis | |
| 5,852,717 A | 12/1998 | Bhide et al. | |
| 5,854,913 A | 12/1998 | Goetz et al. | |
| 5,857,021 A | 1/1999 | Kataoka et al. | |
| 5,867,577 A | 2/1999 | Patarin | |
| 5,872,994 A | 2/1999 | Akiyama et al. | |
| 5,890,189 A | 3/1999 | Nozue et al. | |
| 5,900,606 A | 5/1999 | Rigal | |
| 5,901,225 A | 5/1999 | Ireton et al. | |
| 5,903,752 A | 5/1999 | Dingwall et al. | |
| 5,919,257 A | 7/1999 | Trostle | |
| 5,924,094 A | 7/1999 | Sutter | |
| 5,935,242 A | 8/1999 | Madany et al. | |
| 5,935,247 A | 8/1999 | Pai et al. | |
| 5,937,063 A | 8/1999 | Davis | |
| 5,944,821 A | 8/1999 | Angelo | |
| 5,953,502 A | 9/1999 | Helbig, Sr. | |
| 5,956,408 A | 9/1999 | Arnold | |
| 5,970,147 A | 10/1999 | Davis et al. | |
| 5,978,475 A | 11/1999 | Schneier et al. | |
| 5,978,481 A | 11/1999 | Ganesan et al. | |
| 5,987,557 A | 11/1999 | Ebrahim | |
| 6,014,745 A | 1/2000 | Ashe | |
| 6,032,260 A | 2/2000 | Sasmazel et al. | |
| 6,032,261 A | 2/2000 | Hulyalkar | |
| 6,035,374 A | 3/2000 | Panwar et al. | |
| 6,036,061 A | 3/2000 | O'Donnell | |
| 6,036,601 A | 3/2000 | Heckel | |
| 6,038,322 A | 3/2000 | Harkins | |
| 6,044,478 A | 3/2000 | Green | |
| 6,055,637 A | 4/2000 | Hudson et al. | |
| 6,058,478 A | 5/2000 | Davis | |
| 6,061,794 A | 5/2000 | Angelo | |
| 6,075,938 A | 6/2000 | Bugnion et al. | |
| 6,078,667 A * | 6/2000 | Johnson | 380/44 |
| 6,085,296 A | 7/2000 | Karkhanis et al. | |
| 6,088,262 A | 7/2000 | Nasu | |
| 6,092,095 A | 7/2000 | Maytal | |
| 6,093,213 A | 7/2000 | Favor et al. | |
| 6,101,584 A | 8/2000 | Satou et al. | |
| 6,108,644 A | 8/2000 | Goldschlag et al. | |
| 6,115,816 A | 9/2000 | Davis | |
| 6,125,430 A | 9/2000 | Noel et al. | |
| 6,131,166 A | 10/2000 | Wong-Isley | |
| 6,138,239 A | 10/2000 | Veil | |
| 6,148,379 A | 11/2000 | Schimmel | |
| 6,151,676 A | 11/2000 | Cuccia et al. | |
| 6,154,841 A | 11/2000 | Oishi | |
| 6,158,546 A | 12/2000 | Hanson et al. | |
| 6,173,417 B1 | 1/2001 | Merrill | |
| 6,175,924 B1 | 1/2001 | Arnold | |
| 6,175,925 B1 | 1/2001 | Nardone et al. | |
| 6,178,509 B1 | 1/2001 | Nardone | |
| 6,182,089 B1 | 1/2001 | Ganapathy et al. | |
| 6,185,316 B1 | 2/2001 | Buffam | |
| 6,188,257 B1 | 2/2001 | Buer | |
| 6,192,455 B1 | 2/2001 | Bogin et al. | |
| 6,199,152 B1 | 3/2001 | Kelly et al. | |
| 6,205,550 B1 | 3/2001 | Nardone et al. | |
| 6,212,635 B1 | 4/2001 | Reardon | |
| 6,222,923 B1 | 4/2001 | Schwenk | |
| 6,246,771 B1 * | 6/2001 | Stanton et al. | 380/286 |
| 6,249,872 B1 | 6/2001 | Wildgrube et al. | |
| 6,252,650 B1 | 6/2001 | Nakamura | |
| 6,269,392 B1 | 7/2001 | Cotichini et al. | |
| 6,272,533 B1 | 8/2001 | Browne et al. | |
| 6,272,637 B1 | 8/2001 | Little et al. | |
| 6,275,933 B1 | 8/2001 | Fine et al. | |
| 6,278,782 B1 * | 8/2001 | Ober et al. | 380/264 |

| Patent Number | Date | Inventor |
|---|---|---|
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett |
| 6,301,646 B1 | 10/2001 | Hostetter |
| 6,308,270 B1 | 10/2001 | Guthery et al. |
| 6,314,409 B2 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng |
| 6,339,816 B1 | 1/2002 | Bausch |
| 6,357,004 B1 | 3/2002 | Davis |
| 6,363,485 B1 | 3/2002 | Adams |
| 6,374,286 B1 | 4/2002 | Gee et al. |
| 6,374,317 B1 | 4/2002 | Ajanovic et al. |
| 6,378,068 B1 | 4/2002 | Foster |
| 6,378,072 B1 | 4/2002 | Collins et al. |
| 6,389,403 B1 | 5/2002 | Dorak, Jr. |
| 6,389,537 B1 | 5/2002 | Davis et al. |
| 6,397,242 B1 | 5/2002 | Devine et al. |
| 6,397,379 B1 | 5/2002 | Yates, Jr. et al. |
| 6,411,715 B1 | 6/2002 | Liskov et al. |
| 6,412,035 B1 | 6/2002 | Webber |
| 6,421,702 B1 | 7/2002 | Gulick |
| 6,435,416 B1 | 8/2002 | Slassi |
| 6,445,797 B1 | 9/2002 | McGough et al. |
| 6,463,535 B1 | 10/2002 | Drews et al. |
| 6,463,537 B1 | 10/2002 | Tello |
| 6,473,508 B1 | 10/2002 | Young et al. |
| 6,473,800 B1 | 10/2002 | Jerger et al. |
| 6,496,847 B1 | 12/2002 | Bugnion et al. |
| 6,499,123 B1 | 12/2002 | McFarland et al. |
| 6,505,279 B1 | 1/2003 | Phillips et al. |
| 6,507,904 B1 | 1/2003 | Ellison et al. |
| 6,529,909 B1 | 3/2003 | Bowman-Amuah |
| 6,535,988 B1 | 3/2003 | Poisner |
| 6,557,104 B2 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,633,963 B1 | 10/2003 | Ellison et al. |
| 6,633,981 B1 | 10/2003 | Davis |
| 6,651,171 B1 | 11/2003 | England et al. |
| 6,678,825 B1 | 1/2004 | Ellison et al. |
| 6,684,326 B1 | 1/2004 | Cromer et al. |
| 6,711,263 B1 | 3/2004 | Nordenstam et al. |
| 6,738,904 B2 | 5/2004 | Linnartz et al. |
| 6,792,113 B1 | 9/2004 | Ansell et al. |
| 6,826,616 B2 | 11/2004 | Larson et al. |
| 6,987,853 B2 | 1/2006 | Uner |
| 6,988,250 B1 | 1/2006 | Proudler et al. |
| 7,028,149 B2 | 4/2006 | Grawrock et al. |
| 7,133,990 B2 | 11/2006 | Link et al. |
| 7,165,181 B2 | 1/2007 | Brickell |
| 7,178,030 B2 | 2/2007 | Scheidt et al. |
| 7,181,620 B1 | 2/2007 | Hur |
| 7,216,110 B1 | 5/2007 | Ogg et al. |
| 7,233,666 B2 * | 6/2007 | Lee et al. ............. 380/46 |
| 7,299,500 B1 * | 11/2007 | Klebe et al. .......... 726/26 |
| 7,526,651 B2 | 4/2009 | Arditti Modiano et al. |
| 2001/0011267 A1 * | 8/2001 | Kihara et al. ............ 707/1 |
| 2001/0021969 A1 | 9/2001 | Burger et al. |
| 2001/0027511 A1 | 10/2001 | Wakabayashi et al. |
| 2001/0027527 A1 | 10/2001 | Khidekel et al. |
| 2001/0037450 A1 | 11/2001 | Metlitski et al. |
| 2001/0044786 A1 * | 11/2001 | Ishibashi ............... 705/77 |
| 2001/0044886 A1 | 11/2001 | Cassagnol et al. |
| 2002/0004900 A1 | 1/2002 | Patel |
| 2002/0007456 A1 | 1/2002 | Peinado et al. |
| 2002/0012432 A1 | 1/2002 | England et al. |
| 2002/0023032 A1 | 2/2002 | Pearson et al. |
| 2002/0044567 A1 | 4/2002 | Viot et al. |
| 2002/0048369 A1 * | 4/2002 | Ginter et al. ........... 380/277 |
| 2002/0065136 A1 | 5/2002 | Day |
| 2002/0080190 A1 | 6/2002 | Hamann et al. |
| 2002/0147916 A1 | 10/2002 | Strongin et al. |
| 2002/0166053 A1 | 11/2002 | Wilson |
| 2002/0166061 A1 | 11/2002 | Falik et al. |
| 2002/0169717 A1 | 11/2002 | Challener |
| 2002/0178354 A1 | 11/2002 | Ogg et al. |
| 2002/0178534 A1 | 12/2002 | Massaro |
| 2002/0198302 A1 * | 12/2002 | Rouse et al. ............ 524/407 |
| 2003/0002668 A1 | 1/2003 | Graunke et al. |
| 2003/0018892 A1 | 1/2003 | Tello |
| 2003/0037237 A1 | 2/2003 | Abgrall et al. |
| 2003/0041250 A1 | 2/2003 | Proudler |
| 2003/0074548 A1 | 4/2003 | Cromer et al. |
| 2003/0105718 A1 | 6/2003 | Hurtado et al. |
| 2003/0112008 A1 | 6/2003 | Hennig |
| 2003/0114144 A1 | 6/2003 | Minemura |
| 2003/0115453 A1 | 6/2003 | Grawrock |
| 2003/0126442 A1 | 7/2003 | Glew et al. |
| 2003/0126453 A1 | 7/2003 | Glew et al. |
| 2003/0159056 A1 | 8/2003 | Cromer et al. |
| 2003/0182584 A1 | 9/2003 | Banes et al. |
| 2003/0188156 A1 | 10/2003 | Yasala et al. |
| 2003/0188179 A1 | 10/2003 | Challener et al. |
| 2003/0188181 A1 * | 10/2003 | Kunitz et al. .......... 713/193 |
| 2003/0195857 A1 | 10/2003 | Acquisti |
| 2003/0196085 A1 | 10/2003 | Lampson et al. |
| 2003/0231328 A1 | 12/2003 | Chapin et al. |
| 2003/0235175 A1 | 12/2003 | Naghiam et al. |
| 2004/0003324 A1 | 1/2004 | Uhlig et al. |
| 2004/0039924 A1 | 2/2004 | Baldwin et al. |
| 2004/0064694 A1 * | 4/2004 | Lee et al. ............... 713/168 |
| 2004/0103281 A1 | 5/2004 | Brickell |
| 2004/0107286 A1 | 6/2004 | Larson et al. |
| 2004/0117539 A1 | 6/2004 | Bennett et al. |
| 2004/0123288 A1 | 6/2004 | Bennett et al. |
| 2004/0240667 A1 * | 12/2004 | Lee et al. ............... 380/46 |
| 2004/0260926 A1 | 12/2004 | Arditti Modiano et al. |
| 2005/0010535 A1 | 1/2005 | Camenisch |
| 2005/0081038 A1 | 4/2005 | Arditti Modiano et al. |
| 2005/0100161 A1 * | 5/2005 | Husemann et al. ........ 380/200 |
| 2005/0114682 A1 | 5/2005 | Zimmer et al. |
| 2005/0154890 A1 | 7/2005 | Vembu |
| 2005/0283586 A1 | 12/2005 | Mondal et al. |
| 2006/0013399 A1 | 1/2006 | Brickell et al. |
| 2006/0013400 A1 | 1/2006 | Sutton |
| 2006/0013402 A1 | 1/2006 | Sutton et al. |
| 2006/0020786 A1 * | 1/2006 | Helms et al. ............ 713/165 |
| 2006/0117181 A1 | 6/2006 | Brickell |
| 2007/0100913 A1 * | 5/2007 | Sumner et al. ........... 707/204 |
| 2007/0192829 A1 | 8/2007 | Ford |

FOREIGN PATENT DOCUMENTS

| | | |
|---|---|---|
| CN | 101019368 | 8/2007 |
| CN | 101019369 | 8/2007 |
| DE | 4217444 | 12/1992 |
| DE | 10218835 A1 | 4/2002 |
| DE | 112005001666 T5 | 5/2007 |
| DE | 112005001672 T | 5/2007 |
| DE | 112005001654 T5 | 11/2007 |
| EP | 0473913 | 3/1992 |
| EP | 0492692 | 7/1992 |
| EP | 0600112 | 6/1994 |
| EP | 0602867 | 6/1994 |
| EP | 0877314 | 11/1998 |
| EP | 0892521 | 1/1999 |
| EP | 0930567 | 7/1999 |
| EP | 0961193 | 12/1999 |
| EP | 0965902 | 12/1999 |
| EP | 1030237 | 8/2000 |
| EP | 1055989 | 11/2000 |
| EP | 1056014 | 11/2000 |
| EP | 1067470 | 1/2001 |
| EP | 1085396 | 3/2001 |
| EP | 1146715 | 10/2001 |
| EP | 1209563 | 5/2002 |
| EP | 1271277 | 1/2003 |
| EP | 1617587 | 1/2006 |
| FR | 2620248 | 3/1989 |
| FR | 2700430 | 7/1994 |
| FR | 2714780 | 7/1995 |
| FR | 2742618 | 6/1997 |
| FR | 2752122 | 2/1998 |
| FR | 2763452 | 11/1998 |

| | | |
|---|---|---|
| FR | 2830147 | 3/2003 |
| GB | 2439160 | 12/2007 |
| JP | 2000076139 | 3/2000 |
| JP | 2006293472 | 10/2006 |
| WO | WO-9524696 | 9/1995 |
| WO | WO-9729567 | 8/1997 |
| WO | WO-9812620 | 3/1998 |
| WO | WO-9834365 | 8/1998 |
| WO | WO-9844402 | 10/1998 |
| WO | WO-9905600 | 2/1999 |
| WO | WO-9918511 | 4/1999 |
| WO | WO-9931842 | 6/1999 |
| WO | WO-9957863 | 11/1999 |
| WO | WO-9965579 | 12/1999 |
| WO | WO-0021238 | 4/2000 |
| WO | WO-0049764 | 8/2000 |
| WO | WO-0062232 | 10/2000 |
| WO | WO-0069206 | 11/2000 |
| WO | WO-0127723 | 4/2001 |
| WO | WO-0127821 | 4/2001 |
| WO | WO-0143476 | 6/2001 |
| WO | WO-0163954 | 8/2001 |
| WO | WO-0163994 | 8/2001 |
| WO | WO-0175564 | 10/2001 |
| WO | WO-0175565 | 10/2001 |
| WO | WO-0175595 | 10/2001 |
| WO | WO-0201794 | 1/2002 |
| WO | WO-9909482 | 1/2002 |
| WO | WO-0217555 | 2/2002 |
| WO | WO-0245452 | 6/2002 |
| WO | WO-0245453 | 6/2002 |
| WO | WO-02060121 | 8/2002 |
| WO | WO-02073928 | 9/2002 |
| WO | WO-02086684 | 10/2002 |
| WO | WO-03058412 | 7/2003 |
| WO | WO-2006019614 | 2/2006 |
| WO | WO-2006023151 | 3/2006 |
| WO | WO-2006025952 | 3/2006 |

OTHER PUBLICATIONS

Schneier "Applied Cryptrography", 1996, Wiley and Sons, p. 173.*
Ateniese, Giuseppe, et al., "A Practical and Provably Secure Coalition-Resistant Group Signature Scheme", Advances in Cryptology—CRYPTO2000, vol. 1880 of Lecture Notes in Computer Science, Int'; Assoc for Crypt Res, Spring-Verlag, Berlin, Germany, (2000), 255-270.
Berg, Cliff, "How Do I Create a Signed Applet?", Dr. Dobb's Journal, (Aug. 1997), 1-9.
Brands, Stefan, "Restrictive Blinding of Secret-Key Certificates", Springer-Verlag XP002201306, (1995), Chapter 3.
Chang, T.-W., "Efficient Authentication Schemes Based on Group Certificate and Their Application on Mobile Communication Systems", Thesis for Master of Science, Department of Electrical Engineering, National Cheng Kung University, Tainan, Taiwan, (Jun. 2003).
Chien, Andrew A., et al., "Safe and Protected Execution for the Morph/AMRM Reconfigurable Processor", 7th Annual IEEE Symposium, FCCM '99 Proceedings, XP010359180, ISBN 0-7695-0375-6, Los Alamitos, CA, (Apr. 21, 1999), 209-221.
Compaq Computer Corporation, Trusted Computing Platform Alliance (TCPA) Main Specification Version 1.1a, XP002272822, (Jan. 25, 2001), 1-321.
Coulouris, George, et al., Distributed Systems, Concepts and Designs, 2nd Edition, (1994), 422-424.
Crawford, John, "Architecture of the Intel 80386", Proceedings of the IEEE International Conference on Computer Design: VLSI in Computers and Processors (ICCD '86), (Oct. 6, 1986), 155-160.
Davida, George I., et al., "Defending Systems Against Viruses through Cryptographic Authentication", Proceedings of the Symposium on Security and Privacy, IEEE Comp. Soc. Press, ISBN 0-8186-1939-2, (May 1989).
Fabry, R.S., "Capability-Based Addressing," Communications of the ACM, vol. 17, No. 7, (Jul. 1974), 403-412.
Frieder, Gideon, "The Architecture and Operational Characteristics of the VMX Host Machine", The Architecture and Operational Characteristics of the VMX Host Machine, IEEE, (1982), 9-16.
Goldberg, Robert P., "Survey of Virtual Machine Research", Computer Magazine, (Jun. 1974), 34-45.
Gong, Li , et al., "Going Beyond the Sandbox: An Overview of the New Security Architecture in the Java Development Kit 1.2", Proceedings of the USENIX Symposium on Internet Technologies and Systems, Monterey, CA, (Dec. 1997).
Gum, P. H., "System/370 Extended Architecture: Facilities for Virtual Machines", IBM J. Research Development, vol. 27, No. 6, (Nov. 1983), 530-544.
Hall, Judith S., et al., "Virtualizing the VAX Architecture", ACM SIGARCH Computer Architecture News, Proceedings of the 18th Annual International Symposium on Computer Architecture, vol. 19, Issue No. 3, (Apr. 1991), 10 pages.
Hawthorne, W. M., "An Alternative to Public Key Encryption," European Convention on Security and Detection (May 1995), 142-145. Found at: http://ieeexplore.ieee.org/stamp/stamp.jsp?tp=&arnumber=491615&isnumber=10615.
Heinrich, Joe, MIPS R4000 Microprocessor User's Manual, Second Edition, Chapter 4 "Memory Management", (Jun. 11, 1993), 61-97.
HP Mobile Security Overview, "HP Mobile Security Overview", (Sep. 2002), 1-10.
IBM, "Information Display Technique for a Terminate Stay Resident Program IBM Technical Disclosure Bulletin", TDB-ACC-No. NA9112156, vol. 34, Issue 7A, (Dec. 1, 1991), 156-158.
IBM Corporation, "IBM ThinkPad T30 Notebooks", IBM Product Specification, located at www-1.ibm.com/services/files/cisco_t30_spec_sheet_070202.pdf, last visited Jun. 23, 2004, (Jul. 2, 2002), 1-6.
Intel Corporation, U.S. Patent and Trademark Office Official Action in related U.S. Appl. No. 10/892,256 dated Sep. 29, 2008, with corresponding Reply to Official Action filed Dec. 24, 2008.
Intel Corporation, U.S. Patent and Trademark Office Official Action in related U.S. Appl. No. 10/892,280 dated Nov. 26, 2008.
Intel Corporation, U.S. Patent and Trademark Office Official Action in related U.S. Appl. No. 10/892,280 dated Sep. 12, 2007, with corresponding Reply to Official Action filed Jan. 24, 2008.
Intel Corporation, U.S. Patent and Trademark Office Final Official Action in related U.S. Appl. No. 10/892,280 dated May 14, 2008, with corresponding Reply to Final Official Action filed Jul. 9, 2008.
Intel Corporation, U.S. Patent and Trademark Office Official Action in related U.S. Appl. No. 10/892,256 dated Jul. 23, 2007, with corresponding Reply to Official Action filed Dec. 20, 2007.
Intel Corporation, U.S. Patent and Trademark Office Final Official Action in related U.S. Appl. No. 10/892,256 dated Apr. 1, 2008, with corresponding Reply to Final Official Action filed May 30, 2008, Advisory Action mailed on Jun. 16, 2008.
Intel Corporation, PCT International Search Report and Written Opinion of the International Searching Authority, Application No. PCT/US2005/024486, mailed Sep. 18, 2006.
Intel Corporation, PCT Preliminary Report on Patentability (Chapter 1 of the Patent Cooperation Treaty), Application No. PCT/US2005/024486, mailed Jan. 25, 2007.
Intel Corporation, PCT International Search Report and Written Opinion of the International Searching Authority, Application No. PCT/US2005/024374, mailed Sep. 18, 2006.
Intel Corporation, PCT Preliminary Report on Patentability (Chapter 1 of the Patent Cooperation Treaty), Application No. PCT/US2005/024374, mailed Jan. 25, 2007.
Intel Corporation, PCT International Search Report and Written Opinion of the International Searching Authority, Application No. PCT/US2005/024251, mailed Oct. 6, 2005.
Intel Corporation, PCT International Search Report and Written Opinion of the International Searching Authority, Application No. PCT/US2005/024253, mailed Sep. 18, 2006.
Intel Corporation, PCT Preliminary Report on Patentability (Chapter 1 of the Patent Cooperation Treaty), Application No. PCT/US2005/024253, mailed Jan. 25, 2007.
Intel Corporation, U.S. Patent and Trademark Office, Final Office Action dated Mar. 24, 2009 in related U.S. Appl. No. 10/892,256.
Intel Corporation, U.S. Patent and Trademark Office, Office Action dated Jun. 15, 2009, with Reply to Office Action filed on Sep. 15, 2009, in related U.S. Appl. No. 10/892,265.

Intel Corporation, U.S. Patent and Trademark Office Official Action in related U.S. Appl. No. 10/892,265 dated Nov. 25, 2008, with corresponding Reply to Official Action filed Feb. 25, 2009.

Intel Corporation, U.S. Patent and Trademark Office Official Action in related U.S. Appl. No. 10/892,265 dated Sep. 12, 2007, with corresponding Reply to Official Action filed Jan. 24, 2008.

Intel Corporation, U.S. Patent and Trademark Office Final Official Action in related U.S. Appl. No. 10/892,265 dated Apr. 17, 2008, with corresponding Reply to Final Official Action filed Jun. 17, 2008.

Intel Corporation, Office Action for U.S. Appl. No. 10/185,123, dated Apr. 16, 2007, 10 pages.

Intel Corporation, Office Action for U.S. Appl. No. 10/663,206, dated Apr. 19, 2007.

Intel Corporation, Office Action for U.S. Appl. No. 10/814,569, dated Apr. 5, 2007, 5 pages.

Intel Corporation, PCT Search Report for PCT/US2005/010156, dated Aug. 22, 2006, 6 pages.

Intel Corporation, Final Office Action mailed Jul. 9, 2008, U.S. Appl. No. 10/782,572, 9 pages.

Intel Corporation, Office Action mailed Dec. 23, 2008, U.S. Appl. No. 10/782,572, 8 pages.

Intel Corporation, Notice of Allowance mailed Sep. 11, 2008, U.S. Appl. No. 10/866,252, 7 pages.

Intel Corporation, Office Action mailed Jul. 22, 2009, U.S. Appl. No. 10/782,572, 10 pages.

Intel Corporation, "IA-32 Intel Architecture Software Developer's Manual", vol. 3: System Programming Guide, Intel Corporation—2003, 13-1 through 13-24.

Intel Corporation, "IA-64 System Abstraction Layer Specification", Intel Product Specification, Order No. 245359-001, (Jan. 2000), 1-112.

Intel Corporation, "Intel 82802AB/82802AC Firmware Hub (FWH)", Intel Product Datasheet, Document No. 290658-004, (Nov. 2000), 1-6, 17-28.

Intel Corporation, "Intel IA-64 Architecture Software Developer's Manual", vol. 2: IA-64 System Architecture, Order No. 245318-001, (Jan. 2000), i, ii, 5.1-5.3, 11.1-11.8, 11.23-11.26.

Intel Corporation, "Intel386 DX Microprocessor 32-Bit CHMOS Microprocessor With Integrated Memory Management", (1995), 5-56.

Karger, Paul A., et al., "A VMM Security Kernal for the VAX Architecture", Proceedings of the Symposium on Research in Security and Privacy, XP010020182, ISBN 0-8186-2060-9, Boxborough, MA, (May 7, 1990), 2-19.

Kashiwagi, Kazuhiko, et al., "Design and Implementation of Dynamically Reconstructing System Software", Software Engineering Conference, Proceedings 1996 Asia-Pacific Seoul, South Korea Dec. 4-7, 1996, Los Alamitos, CA USA, IEEE Comput. Soc, US, ISBN 0-8186-7638-8, (1996).

Lawton, Kevin, et al., "Running Multiple Operating Systems Concurrently on an IA32 PC Using Virtualization Techniques", http://www.plex86.org/research/paper.txt, (Nov. 29, 1999), 1-31.

Luke, Jahn, et al., "Replacement Strategy for Aging Avionics Computers", IEEE AES Systems Magazine, XP002190614, (Mar. 1999).

Menezes, Alfred J., et al., Handbook of Applied Cryptography, CRC Press Series on Discrete Mathematics and its Applications, Boca Raton, FL, XP002165287, ISBN 0849385237, (Oct. 1996), 403-405, 506-515, 570.

Menezes, Alfred J., et al., Handbook of Applied Cryptography, CRC Press LLC, USA, (1997), 22, 28-30.

Menezes, Alfred J., et al., Handbook of Applied Cryptography, CRC Press, LLC, pp. 321-322, 330-331, 388-390, 394-395, 397-398, 472, 515-516, 548-552, (1997).

Menezes, Alfred J., et al., "Hash Functions and Data Integrity", Handbook of Applied Cryptography, Chapter 9, CRC Press Inc., 1997.

Motorola, "M68040 User's Manual", (1993), 1-1 to 8-32.

Nanba, S., et al., "VM/4: ACOS-4 Virtual Machine Architecture", VM/4: ACOS-4 Virtual Machine Architecture, IEEE, (1985), 171-178.

Richt, Stefan, et al., "In-Circuit-Emulator Wird Echtzeittauglich", Elektronic, Franzis Verlag GMBH, Munchen, DE, vol. 40, No. 16, XP000259620, (Aug. 6, 1991), 100-103.

Robin, John S., et al., "Analysis of the Pentium's Ability to Support a Secure Virtual Machine Monitor", Proceedings of the 9th USENIX Security Symposium, XP002247347, Denver, Colorado, (Aug. 14, 2000), 1-17.

Rosenberg, Jonathan B., "How Debuggers Work (Algorithms, Data Structures, and Architecture)", Chapters 3 and 5 Hardware Debugger Facilities, Wiley Computer Publishing, United States, (1996), pp. 42-43, 95, 96 and 99.

Rosenblum, M., "Virtual Platform: A Virtual Machine Monitor for Commodity PC", Proceedings of the 11th Hotchips Conference, (Aug. 17, 1999), 185-196.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Saez, Sergio, et al., "A Hardware Scheduler for Complex Real-Time Systems", Proceedings of the IEEE International Symposium on Industrial Electronics, XP002190615, (Jul. 1999), 43-48.

Schneier, Bruce, "Applied Cryptography: Protocols, Algorithm, and Source Code in C", Wiley, John & Sons, Inc., XP002939871; ISBN 0471117099, (Oct. 1995), 47-52.

Schneier, Bruce, "Applied Cryptography: Protocols, Algorithm, and Source Code in C", Wiley, John & Sons, Inc., XP002138607; ISBN 0471117099, (Oct. 1995), 56-65.

Schneier, Bruce, "Applied Cryptography: Protocols, Algorithms, and Source Code C", Wiley, John & Sons, Inc., XP0021111449; ISBN 0471117099, (Oct. 1995), 169-187.

Schneier, Bruce, "Applied Cryptography: Protocols, Algorithms, and Source Code in C", 2nd Edition; Wiley, John & Sons, Inc., XP002251738; ISBN 0471128457, (Nov. 1995), 28-33; 176-177; 216-217; 461-473; 518-522.

Sherwood, Timothy, et al., "Patchable Instruction ROM Architecture", Department of Computer Science and Engineering, University of California, San Diego, La Jolla, CA, (Nov. 2001).

* cited by examiner

METHOD AND APPARATUS FOR AUTHENTICATED, RECOVERABLE KEY DISTRIBUTION WITH NO DATABASE SECRETS

FIELD

One or more embodiments relate generally to the field of cryptography. More particularly, one or more of the embodiments relate to a method and apparatus for authenticated recoverable key distribution with no database secrets.

BACKGROUND

The proliferation of the Internet has led to the creation of a new form of commerce, generally referred to as Internet or electronic commerce (E-commerce). E-commerce enables users to sell and purchase items from a worldwide community connected via the Internet. This added simplicity, coupled with the continually reduced costs and increasing processing speed of modern-day computers, has led to the inclusion of a personal computer (PC) in many homes throughout the world. Unfortunately, the proliferation of PCs within the homes throughout the world, as well as the use of such PCs for E-commerce, often results in the storage of sensitive information within a computer.

As a result, computer users become susceptible to rogue agents, which may desire to gain access to secure information loaded within their personal computer. In order to combat the various rogue agents from gaining access to the secure information, many computer systems employ some form of cryptographs in order to prevent access to sensitive information. As known to those skilled in the art, cryptography provides a technique for keeping information secret, for determining that the information has not been tampered with and for determining the source of the information.

One form of cryptography involves public/private key systems. Public/private key systems encrypt information prior to transmission using a public key and decrypting received encrypted information using a private key that is only known to the recipient of the encrypted information. However, once the sensitive information arrives at its designated location, the information is often decrypted and stored in a clear format. In other words, the sensitive information is not maintained in a secure format at its destination. As a result, during operation of a PC, a rogue agent could possibly gain access to the PC and gain access to sensitive information.

Furthermore, the proliferation of E-commerce has led to the availability of media applications, such as motion pictures and music, which may be downloaded to a PC for one-time use or for use for a predetermined period of time. Unfortunately, without some mechanism for protecting the contents of such media applications from access by rogue agents, E-commerce involving media applications may be prohibitive to the media providers. As a result, media or content providers may be reluctant to create high quality media or content providing applications when such content may be susceptible to rogue agents.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for authenticated recoverable key distribution with no database secrets are described. In one embodiment, an application key is provided to an integrated chip platform. In one embodiment, the integrated chip platform derives a ChipID and a Key Encryption Key. In one embodiment, the integrated chip platform encrypts the application key with the Key Encryption Key, stores the encrypted application key within the persistent memory on the platform, and outputs the ChipID and the encrypted application key, which are stored in a recovery database. In one embodiment, if the encrypted application key is lost, the platform can provide the ChipID to the recovery database, and get the encrypted application key returned. In one embodiment, the ChipID is the public key of a public/private key pair, and the application key is provided to the integrated chip platform by encrypting it using this public key. In one embodiment, the ChipID and the Key Encryption Key are derived from a secret random number programmed into the integrated chip.

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that the invention may be practiced without such specific details. In other instances, control structures and gate level circuits have not been shown in detail to avoid obscuring the invention. Those of ordinary skill in the art, with the included descriptions, will be able to implement appropriate logic circuits without undue experimentation.

In the following description, certain terminology is used to describe features of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a microcontroller, a manageability engine, manageability processor or the like.

Figure 1:
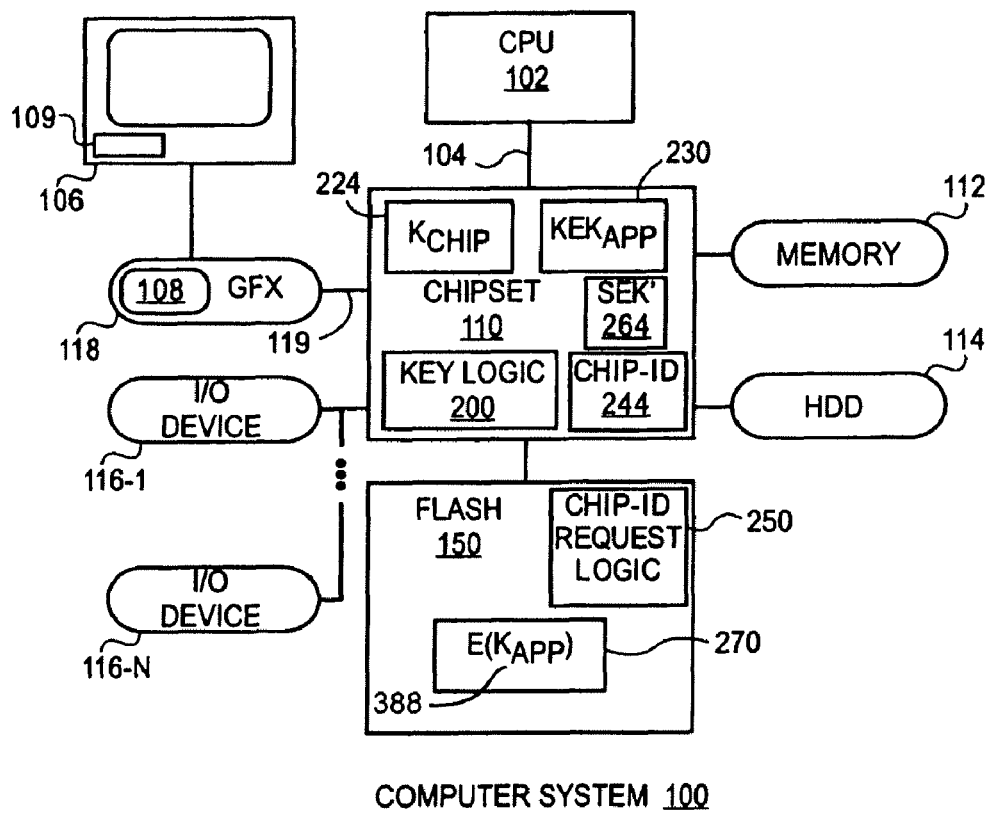
FIG. 1 is a block diagram illustrating a computer system including a chipset having key logic to enable authenticated recoverable key distribution with no database secrets, in accordance with one embodiment.

FIG. 1 is a block diagram further illustrating computer system 100 including key logic 200 to enable authenticated recoverable key distribution with no database secrets, in accordance with one embodiment. Representatively, computer system 100, which may be referred to herein as an "integrated chip platform," comprises a processor system bus (front side bus (FSB)) 104 for communicating information between processor (CPU) 102 and chipset 110. In one embodiment, CPU 102 may be a multi-core processor to provide a symmetric multiprocessor system (SMP). As described herein, the term "chipset" is used in a manner to collectively describe the various devices coupled to CPU 102 to perform desired system functionality.

Representatively, graphics block 118 hard drive devices (HDD) 114 and main memory 112 may be coupled to chipset 110. In one embodiment, chipset 110 is configured to include a memory controller hub (MCH) and/or an input/output (I/O) controller hub (MCH) to communicate with I/O devices 116 (116-1, . . . , 116-N). In an alternate embodiment, chipset 110 is or may be configured to incorporate graphics block 118 and operate as a graphics memory controller hub (GMCH). In one embodiment, chipset 110 may be incorporated into CPU 102 to provide a system on chip. As described herein, a "controller hub" may refer to a chipset, an MCH, an ICH, GMCH or other like hardware configuration having one or more attached input/output (I/O) devices.

In one embodiment, main memory 112 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data. Representatively, computer system 100 further includes non-volatile (e.g., Flash) memory 150. In one embodiment, flash memory 150 may be referred to as a "firmware hub" or FWH, which may include a basic input/output system (BIOS) that is modified to perform, in addition to initialization of computer system 100, initialization of chip identification (ID) logic 250 and key logic 200 to enable authenticated recoverable key distribution to, for example, chipset 110, according to one embodiment.

Figure 5:
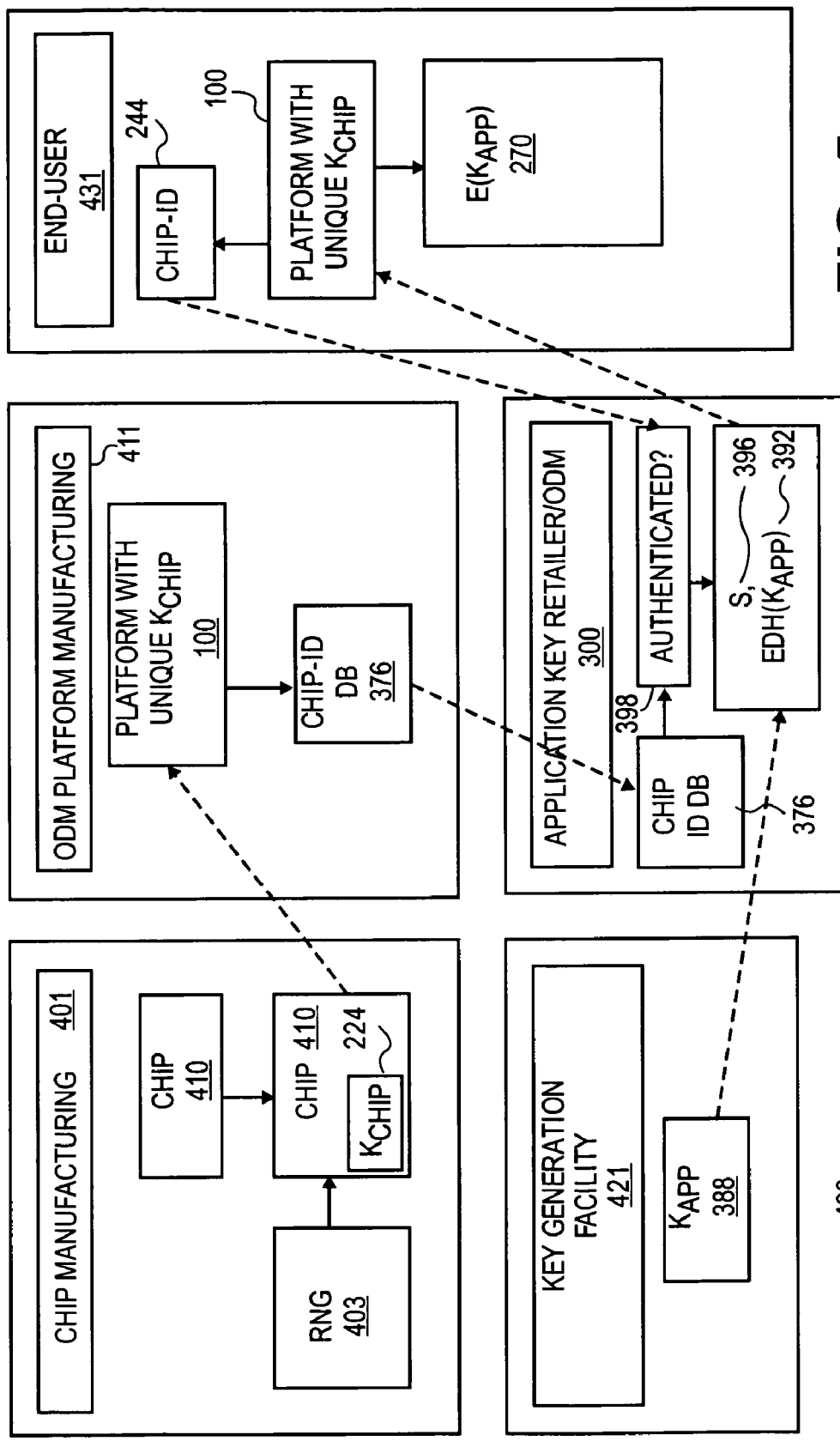
FIG. 5 is a block diagram illustrating an overview of authenticated recoverable key distribution with no database secrets, in accordance with one embodiment.

FIG. 5 is a block diagram illustrating an overview 400 of authenticated recoverable key distribution with no database secrets, in accordance with one embodiment. Representatively, FIG. 5 illustrates the installation of unique random number ($K_{CHIP}$) 224 within chip 410 manufactured by manufacturer 401 and the subsequent assignment of at least one application key ($K_{APP}$) 388 to chip 410 subsequent to integration within integrated chip platform 100, in accordance with one embodiment. As described herein, chip 410 is may alternatively referred to as manufactured chip 410, and integrated chip 410.

As shown in FIG. 1, $K_{APP}$ 388 may be encrypted according to chip secret key ($KEK_{APP}$) 230 and stored within flash memory 150 as $E(K_{APP})$ 270. In one embodiment, $K_{APP}$ 388 may be an a high-bandwidth digital content protection (HDCP) key, for example as described by the "High-bandwidth Digital Content Protection System," Revision 1.1, dated Jun. 9, 2003, referred to herein as the "HDCP System". In accordance with such an embodiment, video transmitter 108 of graphics controller 118, following verification that video receiver 109 of display 106 is licensed to receive HDCP content, may using $K_{APP}$ 388 in the HDCP authentication protocol to setup up a session key to encrypt HDCP content, prior to transmission of the HDCP content to video receiver 109.

In one embodiment, key logic 200 is performed using a computation engine that provides cryptographic application services, such as, for example, an active management technology (AMT) manageability engines (ME) (AMT-ME), AMT processors (AMT-P), or other like logic to provide such cryptographic services. In one embodiment, a chip manufacturer (CM) manufactures chipset 110 to provide cryptographic application services and programs chipset 110 with the unique random number $K_{CHIP}$ 224. In the embodiment shown in FIG. 2, secret key logic 220 of key logic 200 derives a secret encryption key ($KEK_{APP}$) 230 from $K_{CHIP}$ 224. In the embodiment shown in FIG. 1, $KEK_{APP}$ 230 is the key encryption key for $K_{APP}$ 388 that is used to form $E(K_{APP})$ 270 stored within flash memory 150. In one embodiment, a key size of the chip secret key ($KEK_{APP}$) 230 is less than a key size of the application ($K_{APP}$) 270.

Referring again to FIG. 2, in one embodiment, block cipher 226 and stream cipher 234 may be implemented using the advanced encryption standard (AES), the triple data encryption standard (3DES), the data encryption standard (DES) or other like encryption/decryption standard or specification such as the HDCP block cipher (using a stream cipher mode of operation in the case of stream cipher 234). Accordingly, as described herein, the term cryptographic block refers to logic designed to encrypt content or decrypt cipher text according to AES, DES, 3DES or other like encryption/decryption standard. In one embodiment, stream cipher 234 is a stream cipher such as an HDCP stream cipher for example as described according to the HDCP System.

Figure 2:
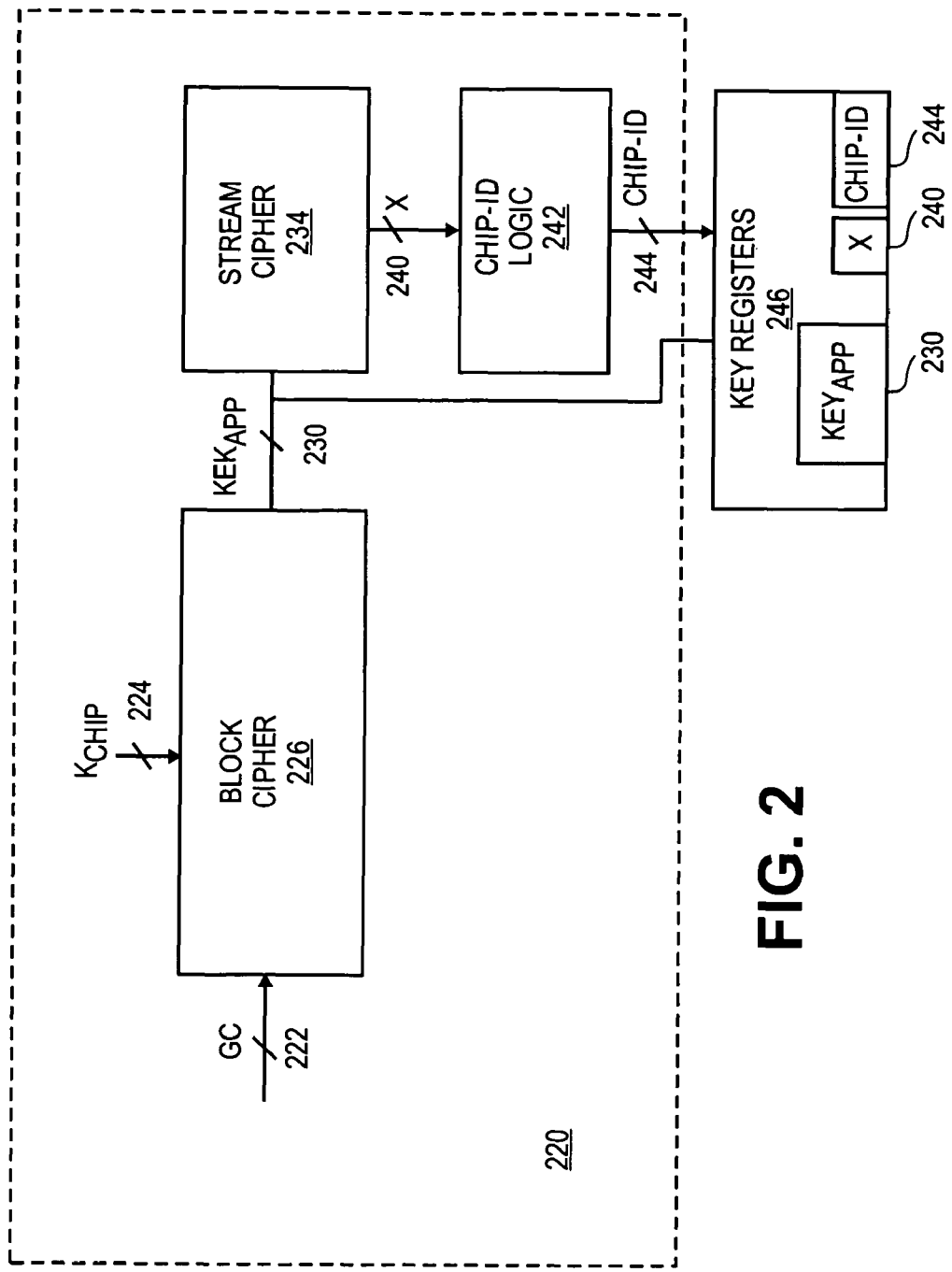
FIG. 2 is a block diagram illustrating secret key logic of the key logic shown in FIG. 1, in accordance with one embodiment.

As illustrated with reference to FIG. 2, global constant GC 222 is initially provided for computing $KEK_{APP}$ 230. As illustrated, a cryptographic computation is used to derive $KEK_{APP}$ 230 from GC 222 and $K_{CHIP}$ 224. In one embodiment, block cipher 226 also receives $K_{CHIP}$ 224 and block cipher 226 encrypts GC 222 using the key $K_{CHIP}$ 224 to form $KEK_{APP}$ 230. In another embodiment, a different cryptographic computation such as a hash function like SHA-1 could be used to derive $KEK_{APP}$ 230 from GC 222 and $K_{CHIP}$ 224. Similarly, a different global constant, GC-ID is provided for computing CHIP-ID. A cryptographic computation is used to derive CHIP-ID from GC-ID and $K_{CHIP}$ 224. In one embodiment, block cipher 226 encrypts GD-ID using $K_{CHIP}$ 224 to form CHIP_ID. In one embodiment, $KEK_{APP}$ 230 and GC-ID are provided to stream cipher 234, which may compute pseudo random value (X) 240. Representatively, X 240 is provided to CHIP-ID logic 242, which performs a modular exponentiation operation according to X 240 and public Diffie-Hellman parameters G and P to form CHIP-ID 244 according to a public value Y of a public/private key pair as follows:

$$Y = G^X \bmod P \quad (1)$$

Once chip CHIP-ID 244 is formed, $KEK_{APP}$ 230, CHIP-ID 244 and X 240 are stored within key registers 246. In one embodiment, $K_{CHIP}$ 224 is installed and programmed into chipset 110 by blowing fuses or equivalent mechanism to $K_{CHIP}$ 224 within chipset 110. In one embodiment, CHIP-ID 244 enables chipset 110 to perform an authentication procedure to establish a secure authenticated channel to enable receipt of $K_{APP}$ 388, in accordance with one embodiment. In one embodiment, $KEK_{APP}$ 230 enables assignment of at least one public/private key crypto-system key to chipset 110.

In one embodiment, the manufactured chipset 110 enables public key cryptography. As described herein, a public key cryptographic system refers to a system that uses two keys; a public key known to everyone, and a private, or secret, key known only to the recipient of digital content. Accordingly, digital content is initially encrypted by transforming the content into an unreadable format referred to as "cipher text" using a recipient's public key. Subsequently, when the encrypted digital content, or cipher text, is received by the recipient, the received content may be decrypted, or deciphered, using the private key of the recipient to form the digital content in the clear format.

However, as will be recognized by those skilled in the art, the embodiments described herein are not limited to public key cryptography or asymmetric encryption, which uses a public key and private key pair, but may be used within systems for symmetric encryption, which uses single secret, or private, key. Hence, the techniques described herein can be modified to function within cryptographic system, such as symmetric key systems that use a single key that both the sender and the recipient have, as well as public key systems that use two related keys; a public key known to everyone and a private key known to only the recipient of encrypted cipher text.

Figure 3:
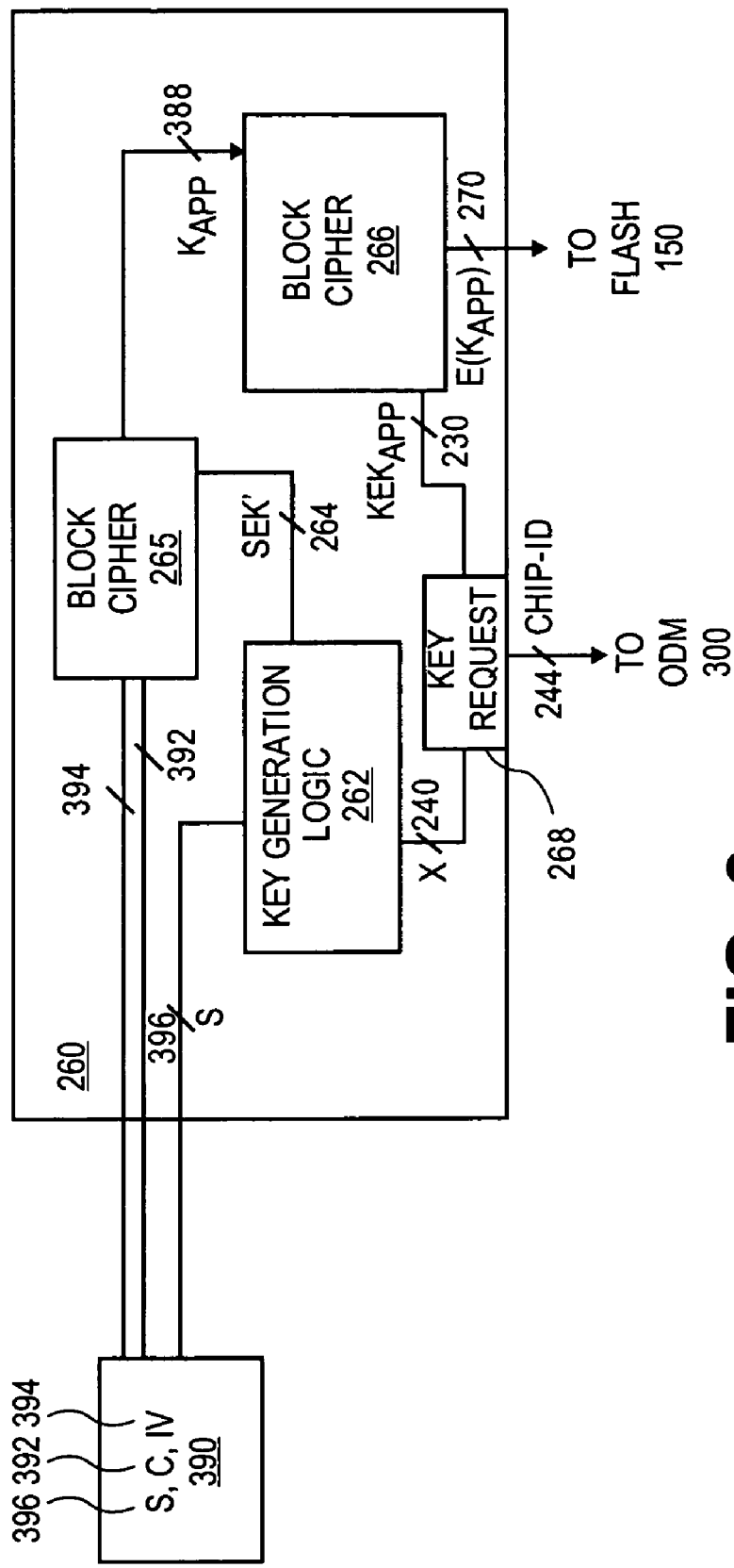
FIG. 3 is a block diagram illustrating key request logic of the key logic shown in FIG. 1, in accordance with one embodiment.

FIG. 3 is a block diagram illustrating key request logic 260 of key logic 200 shown in FIG. 1, in accordance with one embodiment. Representatively, key request logic 260 includes key request block 268 for issuing a key request to an ODM, such as ODM 300 as shown in FIG. 5. In one embodiment, key request includes CHIP-ID 244 to enable encryption of the $K_{APP}$ from a remote Application Key Retailer (AKR) to chipset 110. Referring again to FIG. 1, CHIP-ID request logic 250 enables ODM 300 to capture CHIP-ID 244 during initial integration of chipset 110. In one embodiment, using special manufacturing software, ODM 300 (FIG. 5) asks chipset 110 to produce CHIP-ID 244 and records it in a database 376. In one embodiment, CHIP-ID request logic 250 exposes Chip-ID 244 only if $E(K_{APP})$ 270 is not already present, and this is the first application-specific operation after power-up.

In one embodiment, CHIP-ID 244 is a public key Y, produced by a Diffie-Hellman (DH) key generation from a secret key, X, derived from $K_{CHIP}$ and global constants, described above. In one embodiment, a public key cryptographic function (e.g., an Rivest, Shamir and Adelman (RSA) or elliptic curve cryptography (ECC) key pair) may be used to create an RSA/ECC public/private key pair from X. RSA factors of the modulus and secret exponent can be derived from various components of X, while public key systems based on the discrete logarithm problem can use X as the secret exponent. The CHIP-ID 244 would be the resulting public key. This can be created using well known methods, such as those described in *Applied Cryptography*, by Bruce Schneier, John Wiley & Sons; ISBN: 0471117099; Second Edition (1996).

In one embodiment, ODM 300 may provide $K_{APP}$ directly to the chipset. In another embodiment, ODM 300 may wish to encrypt the $K_{APP}$ from some facility to the chipset which is described in more detail below. Subsequently, block cipher 266 re-encrypts $K_{APP}$ 388 using $KEK_{APP}$ 230 to form encrypted $K_{APP}$ ($E(K_{APP})$) 270. In one embodiment, $E(K_{APP})$ 270 is stored within flash memory 150 (FIG. 1.)

Referring again to FIG. 3, key request logic 260 may include key generation logic 262 that receives random number X 240 and DH public value S 396 of a DH public/private key pair, which is computed by ODM 300 as follows:

$$S = G^R \bmod P \qquad (2)$$

Using X 240 and DH public value S 396, key generation logic 262 may complete a DH key agreement to form the shared secret key to provide a Session encryption key (SEK')

264. In one embodiment, decryption is performed to recover an encrypted, shared secret key (SEK' 264) from an RSA public/private key pair. In one embodiment, SEK' 264 is computed as follows:

$$SEK' = S^X \bmod P \qquad (3)$$

In the embodiment shown in FIG. 3, ODM will encrypt $K_{APP}$ with the same block cipher as the one, block cipher 265, in the chipset using SEK 264 and optional initialization vector (IV) 394 to form cipher text (C) 392. The response 390, received from ODM 300 in response to the key request issued by key request block 268, includes cipher text (C) 392 and optional initialization vector (IV) 394. In one embodiment, first block cipher 265, receives cipher text (C) 392, IV 394 and SEK 264. As illustrated, first block cipher 265 decrypts cipher text C 392 using SEK 264 to recover $K_{APP}$ 388. Alternately, the CHIP-ID public key could be provided by the ODM to a separate party, an Application Key Retailer (AKR), and the AKR could provide the encryption of the $K_{APP}$.

Figure 4:
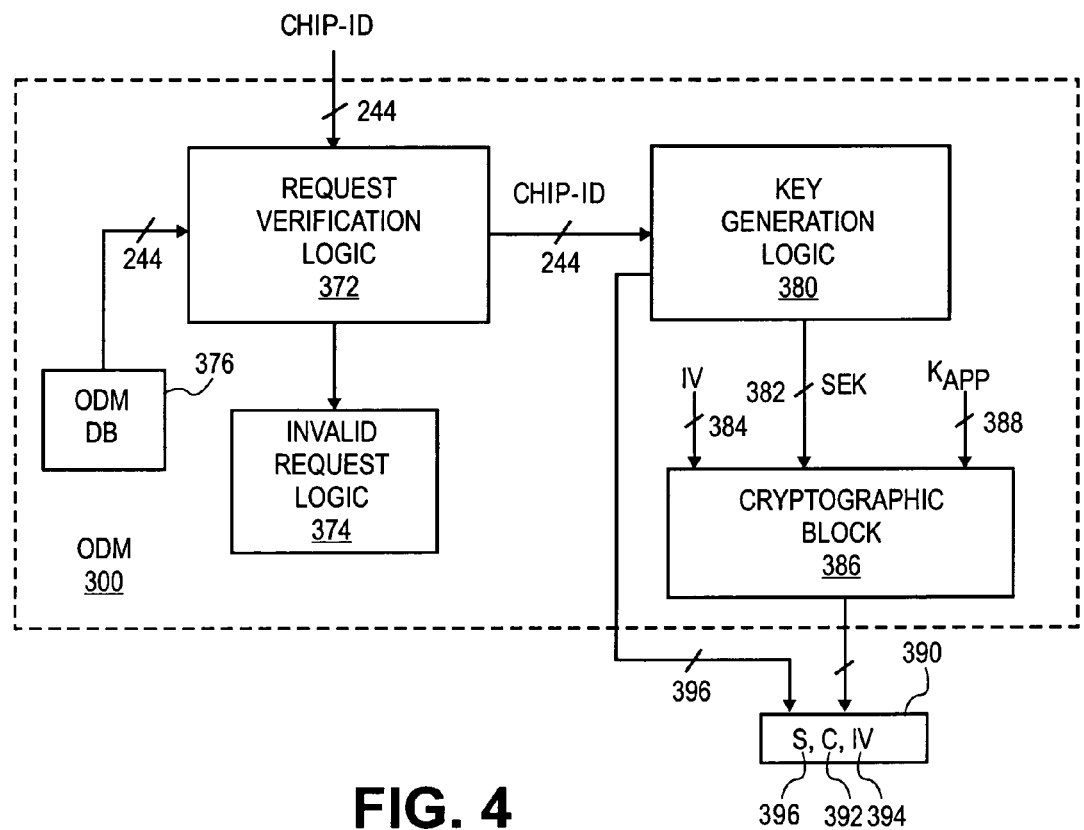
FIG. 4 is a block diagram further illustrating key distribution logic of an original design manufacture, in accordance with one embodiment.

FIG. 4 is a block diagram illustrating key distribution logic of an original design manufacture (ODM) 300, in accordance with one embodiment. In this embodiment, the ODM has previously received the CHIP-ID of the chipset and has the CHIP-ID stored in a database ODM DB 376. Representatively, request verification logic 372 receives CHIP-ID 244 as part of a key request. In one embodiment, request verification logic 372 checks CHIP-ID 244 in ODM DB 376 to ensure that the received key request is from a genuine chipset, generating the same DH public value (CHIP-ID 244) that was recorded when chipset was in physical possession of the ODM at the time of platform manufacturing 411 (authentication). Alternatively, an Application Key Retailer (AKR) having the ODM database performs this check. In one embodiment, failure to find a matching CHIP-ID 244 in ODM DB 376 may cause invalid request logic 374 to notify administrators of the invalid request.

As further illustrated in FIG. 4, once the key request is authenticated, CHIP-ID 244 is provided to key generation logic 380. In one embodiment, key generation logic 380 computes a modular exponentiation operation according to a random number R, CHIP-ID (Y) 244 and public key value P to form the private key of a DH public/private key pair to provide a key encryption key (SEK) 382 as follows:

$$SEK = Y^R \bmod P \qquad (4)$$

In addition, key generation logic 380 computes a modular exponentiation operation according to the random number R and public key values G and P to form public key S 396 of the DH public/private key pair as follows:

$$S = G^R \bmod P \qquad (5)$$

The ODM (or the AKR) will compute the SEK 382. ODM will encrypt $K_{APP}$ with the same block cipher as the one, block cipher 265, in the chipset using SEK 382 and optional initialization vector (IV) 384 to form cipher text (C) 386. In one embodiment, the ODM will encrypt using cipher block chaining (CBC). As known to those skilled in the art, cipher block chaining (CBC) is a confidential mode whose encryption features the combining (chaining) of the plain text blocks with previous cipher blocks.

Once SEK 382 is generated by the chipset, SEK 382 may be provided to cryptographic block 386. In one embodiment block 386 performs cipher block chaining (CBC) mode encryption using a random number or initialization vector (IV) 384 and SEK 382 to produce a message C. In one embodiment, the message C or cipher text 392 is comprised of $K_{APP}$ 388, which is encrypted using SEK 382 (with a Message Authentication Code (MAC)). Once formed, cipher text 392, along with initialization vector 394 and public key S 396 are transmitted to chipset 110.

FIG. 5 is a block diagram illustrating an overview 400 of authenticated recoverable key distribution with no database secrets, in accordance with one embodiment. Representatively, chip 410 is manufactured with a trustworthy (physically protected, able to keep secrets, and perform cryptographic operations with integrity) computation engine (ME). In addition, chip manufacturing (CM) device 401 includes a random number generator (RNG) for programming chip 410 with a unique random number ($K_{CHIP}$) 424. An ODM or platform manufacturing device 411 may include the capability to supply application keys and record chip-specific information in CHIP-ID database (DB) 376.

In one embodiment, platform customer (end-user) 431 is connected to the internet to issue a key request to, for example, ODM 300. In one embodiment, ODM 300 offloads the application key provisioning to another party, such as an Application Key Retailer (AKR) or ODM service department with an internet connection. In one embodiment, an AKR can replace the ODM in to perform key provisioning to end-user 431, if the AKR has received the CHIP-ID DB 376 with integrity.

In one embodiment, using special manufacturing software, the ODM 300 asks the chip 410 to produce a chip-specific CHIP-ID 244 (a non-secret value derived from $K_{CHIP}$ 224) and records it in CHIP-ID DB 376. In one embodiment, CHIP-ID 244 serves as the identity of chip 410. Referring again to FIG. 1, CHIP-ID request logic 250 enables the ODM to capture CHIP-ID 244 during initial integration of chipset 110. In one embodiment, using special manufacturing software, the ODM 300 (FIG. 5) asks chipset to produce CHIP-ID 244 and records it in a database 376. In one embodiment, CHIP-ID request logic 250 exposes CHIP-ID 244 only if $E(K_{APP})$ 270 is not already present, and this is the first application-specific operation after power-up.

In one embodiment, ODM 300 optionally obtains application keys ($K_{APP}$) 388 from the key generation facility (KGF) 421, and selects one application key for provisioning on the current system. The ODM 300 inputs this selected application key and has chip 410 encrypt the chip-unique application key using $KEK_{APP}$ 230. In one embodiment, the encrypted application key $E(K_{APP})$ 270 output by chip 410 is read by the ODM manufacturing software, so that it may be stored externally by ODM 300 in persistent (flash) memory on integrated chip platform 100.

In one embodiment, ODM 300 may record $E(K_{APP})$ 270 (indexed by CHIP-ID 244) in a CHIP-ID DB 376 to support restoration, should the flash memory be corrupted after manufacture. Alternatively, the ODM may deliver CHIP-ID DB 376 with integrity to an AKR to allow the $K_{APP}$ 388 to be provisioned in the field in response to an issue key request, referred to herein as "dynamic provisioning," as described in further detail below.

In one embodiment, end-user 431 may use special software after reboot (to protect privacy) to generate a key (re)provisioning request. In one embodiment, if $E(K_{APP})$ 270 is lost due to flash corruption, service can restore the flash but it will have no chip-specific information, including $E(K_{APP})$ 270. As shown in FIG. 5, special software executed right after power-on may request a new key from ODM 300 over the internet and re-flash the encrypted key values. In one embodiment, the special software acquires CHIP-ID 244 immediately after power up by using CHIP-ID request logic 250, as shown in FIG. 1. In one embodiment, CHIP-ID 244 is available only immediately after power up to avoid having the CHIP-ID 244 accessible to normal software and thus becoming an identifier for the platform.

Referring again to FIG. 5, CHIP-ID 244 is sent to ODM 300. In one embodiment, ODM 300 performs a database lookup CHIP-ID DB 376 for the value of the encrypted application key $E(K_{APP})$ 270 output chip 410 with CHIP-ID 244. In one embodiment, ODM 300 sends $E(K_{APP})$ 270 to end-user 431 to complete the key re-provisioning request. Subsequently, end-user 431 would place $E(K_{APP})$ 270 back into flash memory 150. Procedural methods for implementing one or more of the above-mentioned embodiments are now described.

Figure 6:
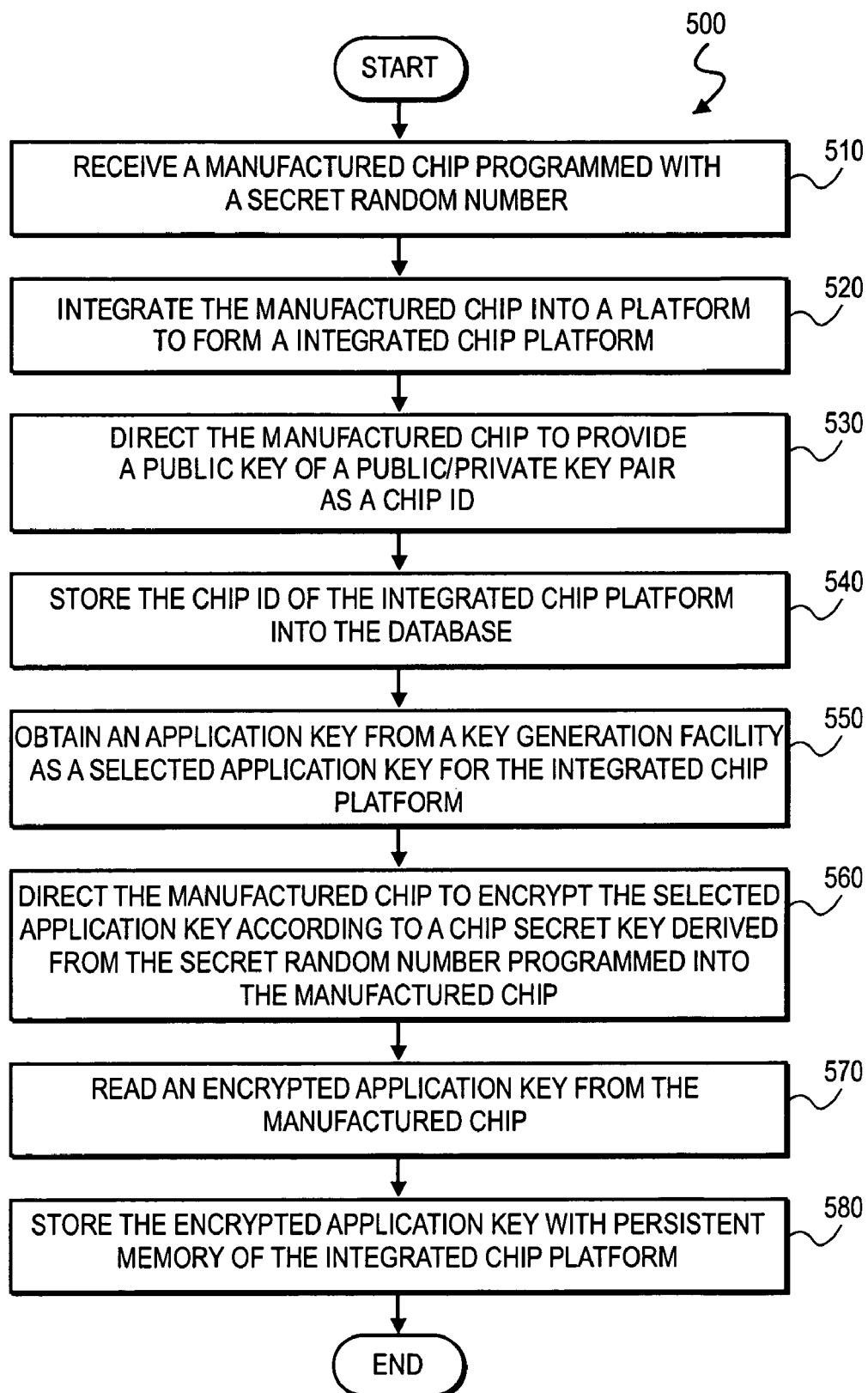
FIG. 6 is a flowchart illustrating a method for installing a secret random number within a manufactured chip to enable authenticated recoverable key distribution with no database secrets, in accordance with one embodiment.

Turning now to FIG. 6, the particular methods associated with various embodiments are described in terms of computer software and hardware with reference to a flowchart. The methods to be performed by a computing device (e.g., a graphics controller) may constitute state machines or computer programs made up of computer-executable instructions. The computer-executable instructions may be written in a computer program and programming language or embodied in firmware logic. If written in a programming language conforming to a recognized standard, such instructions can be executed in a variety of hardware platforms and for interface to a variety of operating systems.

In addition, embodiments are not described with reference to any particular programming language. It will be appreciated that a variety of programming languages may be used to implement embodiments as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 6 is a flowchart illustrating a method 500 for authenticated recoverable key distribution with no database secrets, in accordance with one embodiment. In the embodiments described, examples of the described embodiments will be made with reference to FIGS. 1-5. However, the described embodiments should not be limited to the examples provided to limit the scope provided by the appended claims.

Referring again to FIG. 6, at process block 510, a manufactured chip programmed with a secret random number is received. At process block 520, the manufactured chip is integrated into a platform to form the integrated chip platform. At process block 530, using special manufacturing software, the ODM 300 asks the chip 410 to produce a chip-specific CHIP-ID 244 (a non-secret value derived from $K_{CHIP}$ 224.) At process block 540 the CHIP-ID 244 is recorded in CHIP-ID DB 376. Referring again to FIG. 1, CHIP-ID request logic 250 enables the ODM to capture CHIP-ID 244 during initial integration of chipset 110.

Referring again to FIG. 6, at process block 550 ODM 300 obtains application keys ($K_{APP}$) 388 from the key generation facility (KGF) 421, and selects one application key for provisioning on the current system. At process block 560 ODM 300 inputs this selected application key and has the chip encrypt the chip-unique application key using $KEK_{APP}$ 230. At process block 570, the encrypted application key $E(K_{APP})$ 270 output by chip 410 is read by the ODM manufacturing software. At process block 580, the encrypted application key $E(K_{APP})$ 270 output by chip 410 is stored externally by ODM 300 in persistent (flash) memory 150 of integrated chip platform 100, as shown in FIG. 1.

In one embodiment, ODM 300 may record $E(K_{APP})$ 270 (indexed by CHIP-ID 244) in a CHIP-ID DB 376 to support restoration, should the flash memory be corrupted after manufacture. Alternatively, the ODM may deliver CHIP-ID DB 376 with integrity to an AKR to allow the $K_{APP}$ 388 to be provisioned in the field in response to an issue key request, referred to herein as "dynamic provisioning," as described FIG. 7.

Figure 7:
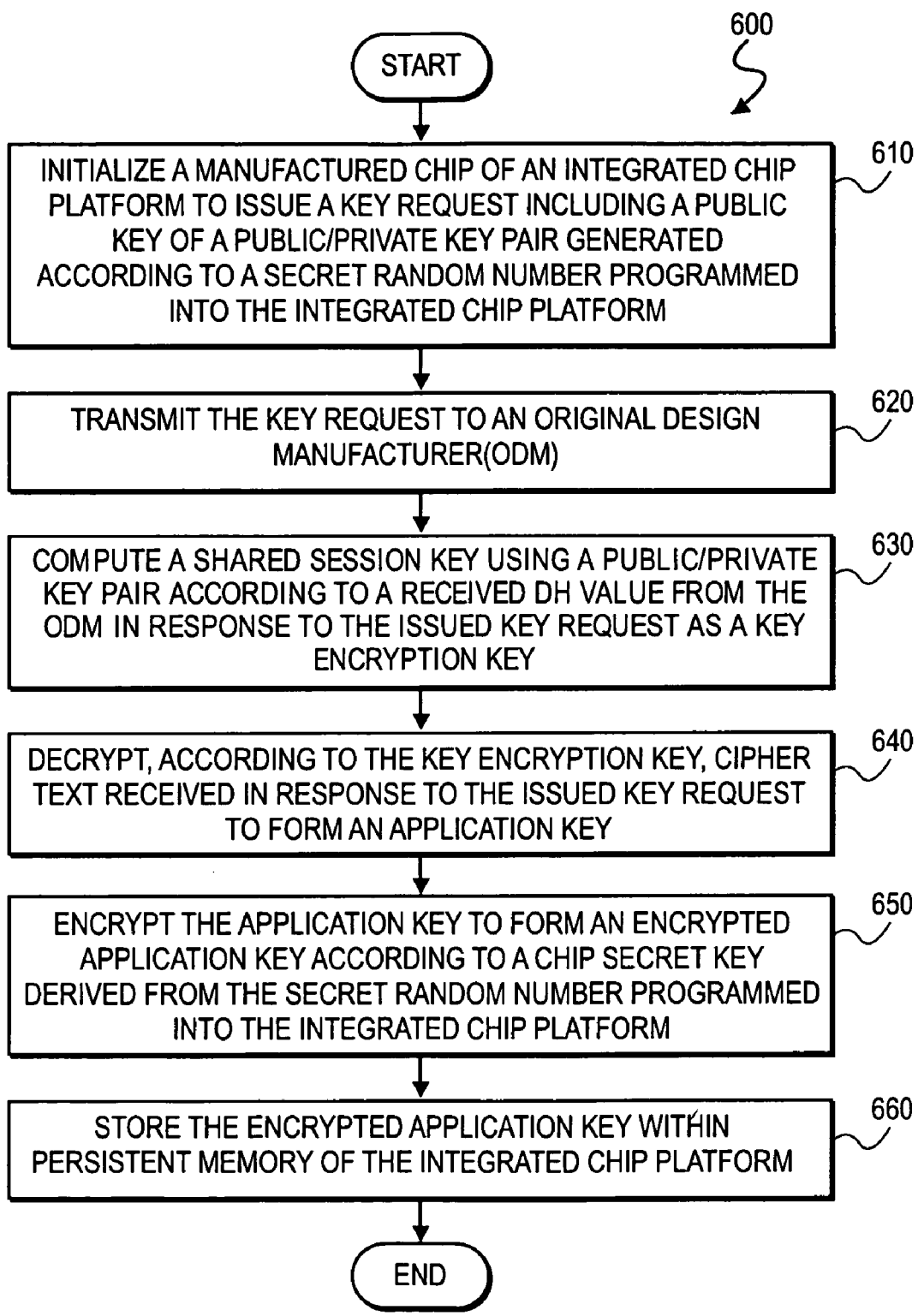
FIG. 7 is a flowchart illustrating a method for generating a secret chip key from the secret random number programmed into an integrated chip platform to encrypt an application key received in response to an issued key request, in accordance with one embodiment.

FIG. 7 is a flowchart illustrating a method 600 for generating a secret chip key from the secret random number programmed into an integrated chip platform to encrypt an application key received in response to an issued key request, in accordance with one embodiment. At process block 610, after booting with privacy-preserving settings disabled, software directs a computation engine (ME) of key logic 200 to use $K_{CHIP}$ 224 to derive chip-unique DH value pair Y (CHIP-ID 244) of a DH public/private key pair. At process block 620, software sends the DH public value Y (CHIP-ID 244) to ODM 300 over the internet as a key request.

As shown in FIG. 5, in one embodiment, ODM 300 checks DH public value (CHIP-ID 244) in CHIP-ID DB 376 to ensure that it is a genuine chip generating the same Y value that was recorded when chip was in physical possession (authentication 398). Alternatively, an AKR having the CHIP-ID DB 376 performs the authentication of block 398. Subsequently, ODM 300 completes DH agreement to create fresh key (session) encryption key (SEK, see equation (4).) In addition, ODM 300 encrypts a new application key $K_{APP}$ 388 from the KGF 421 using SEK 382 (with Message Authentication Code (MAC).) In one embodiment, ODM sends fresh DH public value S 396 and cipher text 392 to platform 100 over the internet, and may store the encrypted key EDH ($K_{APP}$) 392 in CHIP-ID DB 376 for recovery (avoiding having to obtain a new key if flash is corrupted as above.)

Referring again to FIG. 7, at process block 630, ME of key logic 200 completes the DH agreement to get key SEK' 264 (see equation (3)), and writes cipher text C 392 to key registers 246. At process block 640, decrypts, according to SEK' 264, cipher text received in response to the issued key request to form an application key ($K_{APP}$ 388.) At process block 650, the application key is encrypted to form an encrypted application key (E($K_{APP}$) 270) according to a chip secret key (KEK$_{APP}$ 230) derived from the secret random number ($K_{CHIP}$ 224) programmed into integrated chip platform 100. In an alternative embodiment, if RSA is used rather than DH, ODM 300 could encrypt a randomly chooses KEK 264 in step 650 to form encrypted session key 396 (in place of DH value 396), and at step 630, ME of key logic 200 would decrypt encrypted session key 396 to recover KEK' 264. At process block 660, the encrypted application key (E($K_{APP}$) 270) is stored within persistent memory (flash memory 150) of integrated chip platform 100.

Accordingly, as shown in FIG. 7, to provide dynamic key provision, a computation engine (ME) of key logic 200 uses simultaneous KEK decrypt/KEK$_{APP}$ encrypt flow to decrypt the keys and re-encrypt for the chip. In one embodiment, key logic 200 also computes a message authentication code (MAC) for key corruption detection. In one embodiment, ME of key logic 200 reads-out encrypted application key and MAC from the chip output register and writes it into flash 150.

Figure 8:
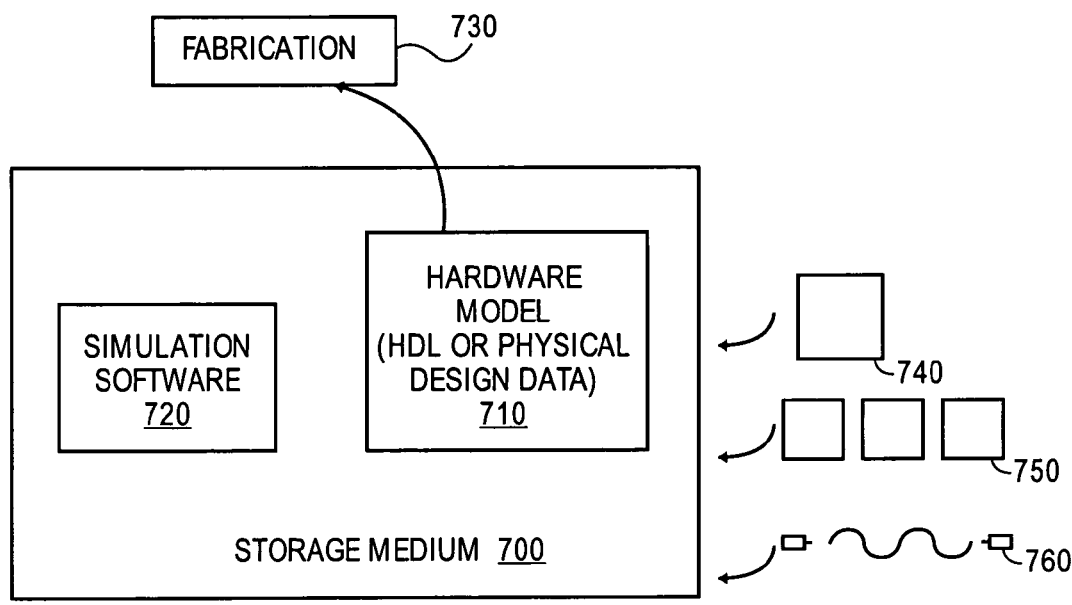
FIG. 8 is a block diagram illustrating various design representations or formats for simulation, emulation and fabrication of a design using the disclosed techniques.

FIG. 8 is a block diagram illustrating various representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 710 may be stored in a storage medium 700, such as a computer memory, so that the model may be simulated using simulation software 720 that applies a particular test suite 730 to the hardware model to determine if it indeed functions as intended. In some embodiments, the simulation software is not recorded, captured or contained in the medium.

Additionally, a circuit level model with logic and/or transistor gates may be produced at some stages of the design process. The model may be similarly simulated some times by dedicated hardware simulators that form the model using programmable logic. This type of simulation taken a degree further may be an emulation technique. In any case, reconfigurable hardware is another embodiment that may involve a machine readable medium storing a model employing the disclosed techniques.

Furthermore, most designs at some stage reach a level of data representing the physical placements of various devices in the hardware model. In the case where conventional semiconductor fabrication techniques are used, the data representing the hardware model may be data specifying the presence or absence of various features on different mask layers or masks used to produce the integrated circuit. Again, this data representing the integrated circuit embodies the techniques disclosed in that the circuitry logic and the data can be simulated or fabricated to perform these techniques.

In any representation of the design, the data may be stored in any form of a machine readable storage medium. An optical or electrical wave 760 modulated or otherwise generated to transport such information, provides an example of a machine readable transmission medium. A memory 750 or a magnetic or optical storage 740, such as a disk, may be a machine readable storage medium. Any machine readable transmission medium may carry the design information. The term "carry" (e.g., a machine readable transmission medium carrying information) thus covers information encoded or modulated into or onto a carrier wave. The set of bits describing the design or a particular of the design are (when embodied in a machine readable storage medium) an article that may be sealed in and out of itself, or used by others for further design or fabrication.

It will be appreciated that, for other embodiments, a different system configuration may be used. For example, while the system 100 includes a single CPU 102, for other embodiments, a symmetric multiprocessor system (SMP) (where one or more processors or processor cores may be similar in configuration and operation to the CPU 102 described above) may benefit from the authenticated recoverable key distribution with no database secrets of various embodiments. Further different type of system or different type of computer system such as, for example, a server, a workstation, a desktop computer system, a gaming system, an embedded computer system, a blade server, etc., may be used for other embodiments.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments described may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

In the above detailed description of various embodiments, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments is defined only by the appended claims, along with the full range of equivalents to which such claims are entitled.

Having disclosed embodiments and the best mode, modifications and variations may be made to the disclosed embodiments while remaining within the scope of the embodiments as defined by the following claims.

What is claimed is:

1. A method comprising:
    issuing, by a chip, a key request including a chip identification (ID), the chip ID generated according to a secret random number programmed into the chip prior to integration of the chip within a platform to form an integrated chip platform, the chip ID previously sent from the integrated chip platform in response to a determining that no encrypted application key is present on the integrated chip platform and that sending the chip ID is a first application-specific operation since a power-up of the integrated chip platform;
    decrypting cipher text received in response to the issued key request to access an application key assigned to the integrated chip platform;
    storing an encrypted application key within persistent memory of the integrated chip platform, the assigned application key encrypted, by the chip, to form the encrypted application key according to a chip secret key derived from the secret random number programmed into the chip; and
    outputting the encrypted application key to enable recovery of the encrypted application key in response to a key reprovisioning request, from the chip, that is authenticated according to the chip ID.

2. The method of claim 1, wherein the method, prior to issuing the key request, further comprises:
    reading the secret random number from chip fuses of the integrated chip platform; and
    encrypting a global constant with the secret random number programmed into the integrated chip platform as a key to form the chip secret key.

3. The method of claim 1, further comprising:
    generating a random number according to the chip secret key;
    computing a modular exponentiation operation according to public key parameters and the generated random number to form the public key of the public/private key pair; and
    storing the public key, the chip secret key and the random number within key registers of the integrated chip platform, wherein a key size of the chip secret key is less than a key size of the application key.

4. The method of claim 1, wherein generating the shared secret key comprising:
    generating a random number according to the chip secret key;
    computing a modular exponentiation operation according to the received public key, a public key parameter and the generated random number to form the shared secret key.

5. The method of claim 1, wherein generating the shared secret key further comprises:
    completing a Diffie-Hellman key agreement to form the shared secret key.

6. A method comprising:
    generating a secret session key according to a chip identification (ID) that is received with a key provisioning request received from an integrated chip platform, wherein the key provisioning request is authenticated according to the chip ID, wherein the chip ID is received in response to a determining that no encrypted application key is present on the integrated chip platform and that sending the chip ID is a first application-specific operation since a power-up of the integrated chip platform;
    generating, according to the secret session key, cipher text including an application key assigned to the integrated chip platform according to the authenticated key provisioning request;
    transmitting, to the integrated chip platform, the cipher text including the assigned application key; and
    storing an encrypted application key, indexed by the chip ID, to enable recovery of the encrypted application key in response to a key reprovisioning request, from the chip, that is authenticated according to a chip ID, wherein the assigned application key is encrypted, by the chip, to form the encrypted application key according to a chip secret key derived from the secret random number programmed into the integrated chip platform.

7. The method of claim 6, wherein the method, prior to generating the secret session key, further comprises:
    receiving the key provisioning request including the received public key of the public/private key pair as a chip identification (ID) of the integrated chip platform;
    querying a database according to the chip ID; and
    verifying that the chip ID received with the key provisioning request is a valid chip ID if a matching chip ID is detected within the data base.

8. The method of claim 6, wherein generating the secret session key comprises:
    generating a random number; and
    computing a modular exponentiation operation according to the received public key, a public key parameter and the generated random number to form the secret session key.

9. The method of claim 6, wherein the method, prior to generating the secret session key, further comprises:
    receiving a manufactured chip programmed with a secret random number;

integrating the manufactured chip into a platform to form the integrated chip platform;

directing the manufactured chip to provide the received public key of the public/private key pair as the chip ID; and storing the chip ID of the integrated chip platform in to the database.

10. The method of claim 9, further comprising:

obtaining an application key from a key generation facility as a selected application key for the integrated chip platform;

directing the manufactured chip to encrypt the selected application key according to a chip secret key derived from the secret random number programmed into the manufactured chip;

reading an encrypted application key from the manufactured chip; and storing the encrypted application key within persistent memory of the integrated chip platform; and storing the encrypted application key within the database, indexed by the chip ID.

11. An article of manufacture including a non-transitory machine accessible storage medium having stored thereon data which, when accessed, results in the machine performing operations comprising:

with a manufactured chip of an integrated chip platform, sending a chip identification (ID) from the integrated chip platform in response to a determining that no encrypted application key is present on the integrated chip platform and that sending the chip ID is a first application-specific operation since a power-up of the integrated chip platform, the chip ID generated according to a secret random number programmed into manufactured chip prior to integration of the chip within a platform to form the integrated chip platform;

after the sending the chip ID, transmitting from the integrated chip platform to an original design manufacturer (ODM) a key request including the chip ID;

decrypting, according to a key encryption key, cipher text received in response to the issued key request to access an application key assigned to the integrated chip platform by the ODM;

encrypting, by the manufactured chip, the assigned application key to form an encrypted application key according to a chip secret key derived from the secret random number programmed into the integrated chip platform;

storing the encrypted application key within persistent memory of the integrated chip platform; and outputting the encrypted application key to enable recovery of the encrypted application key in response to a key reprovisioning request, from the manufactured chip, that is authenticated according to the chip ID.

12. The article of manufacture of claim 11, wherein the non-transitory machine readable storage medium further includes associated data, which when accessed, further results in the machine performing operations, comprising:

reading the secret random number from chip fuses of the integrated chip platform; and encrypting a global constant with the secret random number programmed into the integrated chip platform as a key to form the chip secret key.

13. The article of manufacture of claim 11, wherein the non-transitory machine readable storage medium further includes associated data, which when accessed, further results in the machine performing operations, comprising:

generating a random number according to the chip secret key;

computing a modular exponentiation operation according to the received public key, a public key parameter and the generated random number to form the public key of the public/private key pair; and storing the public key, the chip secret key and the random number within key registers of the integrated chip platform.

14. An integrated chip platform comprising:

key generation logic including secret key logic to derive a chip secret key from a secret random number programmed into the chip prior to integration of the chip within a platform to form the integrated chip platform, and key request logic to decrypt cipher text, received in response to an issued key request, to access an application key assigned to the integrated chip platform and to store an encrypted application key within persistent memory of the integrated chip platform, the assigned application key encrypted to form the encrypted application key according to the chip secret key, the key generation logic to output the encrypted application key to enable recovery of the encrypted application key in response to a key reprovisioning request, from the integrated chip platform, that is authenticated according to a chip identification (ID);

chip identification logic to send the chip ID from the integrated chip platform in response to a determining that no encrypted application key is present on the integrated chip platform and that sending the chip ID is a first application-specific operation since a power-up of the integrated chip platform, the chip ID generated according to the chip secret key, the chip identification logic further to output the chip ID within the issued key request; and at least one key register to store the chip secret key, wherein the issued key request is authenticated according to the chip ID.

15. The integrated chip platform of claim 14, wherein the secret key logic further comprises:

a first cryptographic block to encrypt a global constant with the secret random number programmed into the integrated chip platform as a key to form the chip secret key.

16. The integrated chip of claim 15, wherein the secret key logic further comprises further comprising:

a second cryptographic block to encrypt the chip secret key to generate a random number; and a modular exponentiation block to compute a modular exponentiation operation according to public key parameters and the generated random number to form a public key of a public/private key pair as a chip identification (ID) of the integrated chip platform.

17. The integrated chip of claim 14, wherein the key request logic further comprises:

a modular exponentiation block to compute a modular exponentiation operation according a received public key in response to the issued key request and public key parameters to form a shared secret key as a key encryption key;

a first cryptographic block to decrypt, according to the key encryption key, cipher text received I response to the issued key request to form an application key; and a second cryptographic block to encrypt the application key to form an encrypted application key according to a chip secret key.

18. The integrated chip platform of claim 15, further comprising:

chip identification logic to provide a public key of a public/private key pair as a chip identification (ID) of the integrated chip platform in response to a received chip-ID request if the encrypted application key is not stored within the persistent memory of the integrated chip platform, the received chip-ID request is a first application-specific operation after power-up of the integrated chip platform.

19. A system comprising:

a flash memory;

a graphics controller coupled to the flash memory including key logic, the key logic including secret key logic to derive a chip secret key from a secret random number programmed into a graphics controller chip prior to integration of the chip within the system, and key request logic to decrypt cipher text, received in response to an issued key request, to access an application key assigned to the integrated chip platform and to store an encrypted application key within the flash memory, the assigned application key encrypted to form the encrypted application key according to the chip secret key, the key logic to output the encrypted application key to enable recovery of the encrypted application key in response to a key reprovisioning request, from the graphics controller chip, that is authenticated according to a chip identification (ID);

chip identification logic to send the chip ID from the integrated chip platform in response to a determining that no encrypted application key is present on the integrated chip platform and that sending the chip ID is a first application-specific operation since a power-up of the integrated chip platform, the chip ID generated according to the chip secret key, the chip identification logic further to output the chip ID within the issued key request; and at least one key register to the store the chip secret key.

20. The system of claim 19, wherein the key logic comprises: a manageability engine to provide cryptographic application services.

21. The system of claim 19, further comprising:

a display coupled to the graphics controller including a high-bandwidth digital content protection (HDCP) receiver to receive HDCP content from an HDCP transmitter of the graphics controller, the HDCP content encrypted according to the application key as an HDCP key.

22. A method comprising:

receiving from an integrated chip platform a chip identification (ID) generated in response to a determining that no encrypted application key is present on the integrated chip platform and that sending the chip ID is a first application-specific operation since a power-up of the integrated chip platform;

obtaining an application key from a key generation facility as an assigned application key for the integrated chip platform in response to a key request issued by a manufactured chip of the integrated chip platform, the key request including the chip ID;

directing a manufactured chip of the integrated chip platform to encrypt the assigned application key according to a chip secret key derived from a secret random number programmed into the manufactured chip prior to integration of the manufactured chip within a platform to form the integrated chip platform; and storing an encrypted application key within persistent memory of the integrated chip platform; and storing an encrypted application key, indexed by the chip ID, to enable recovery of the encrypted application key in response to a key reprovisioning request, from the manufactured chip, that it is authenticated according to the chip ID.

23. The method of claim 22, wherein the method, prior to obtaining the application key, further comprises:

receiving the manufactured chip programmed with the secret random number;

integrating the manufactured chip into a platform to form the integrated chip platform; directing the manufactured chip to provide a chip identification (ID) of the integrated chip platform; and storing the chip ID of the integrated chip platform in to a database.

24. The method of claim 22, wherein storing the encrypted application key further comprising:

reading an encrypted application key from the manufactured chip; and directing the manufactured chip to provide a chip identification (ID) of the integrated chip platform;

storing the chip ID of the integrated chip platform in to a database; and storing the encrypted application key within the database, indexed by the chip ID.

25. The method of claim 22, wherein the method, prior to obtaining the application key, further comprises:

reading, by the manufactured chip, the secret random number from chip fuses of the manufactured chip; and encrypting, by the manufactured chip, a global constant with the secret random number programmed into the manufactured chip as a key to form the chip secret key.

26. The method of claim 24, wherein directing the manufactured chip to provide the chip ID further comprises:

computing, by the manufactured chip, the chip ID using a cryptographic computation with one or more global constants and the secret random number programmed into the manufactured chip as inputs.

* * * * *